(12) United States Patent
Da Palma et al.

(10) Patent No.: US 6,874,020 B1
(45) Date of Patent: Mar. 29, 2005

(54) SYSTEM USES APPLICATION MANAGER AND MASTER AGENT TO COMMUNICATE WITH MINI-AGENTS FOR REMOTELY MANAGING APPLICATION RESOURCES DISTRIBUTED ACROSS MULTIPLE JAVA VIRTUAL MACHINES

(75) Inventors: William V. Da Palma, Deerfield Beach, FL (US); Wendi L. Nusbickel, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 689 days.

(21) Appl. No.: 09/649,121

(22) Filed: Aug. 28, 2000

(51) Int. Cl.[7] ............................................. G06F 15/173
(52) U.S. Cl. ....................... 709/223; 709/202; 709/224
(58) Field of Search ................................. 709/223, 202, 709/224, 227, 316

(56) References Cited

U.S. PATENT DOCUMENTS

| | | | |
|---|---|---|---|
| 6,195,678 B1 | * | 2/2001 | Komuro |
| 6,363,421 B2 | * | 3/2002 | Barker et al. |
| 6,633,923 B1 | * | 10/2003 | Kukura et al. |
| 6,675,375 B1 | * | 1/2004 | Czajkowski ................. 717/151 |
| 2002/0169878 A1 | * | 11/2002 | Orenshteyn .................. 709/227 |

OTHER PUBLICATIONS

Sun Microsystems, Inc., Java Management Extensions Instrumentation and Agent Specification, v1.0 ( May 2000).*

Sun MicrosystemInc., Java Masnagement Extensions white Paper. Dynamic Management for the service age, Jun. 1999.*

Sun Microsystems, Inc., *Java Management Extensions Instrumentation and Agent Specification*, v1.0 (May 2000).

Sun Microsystems, Inc., *Remote Method Invocation Specification*, v1.01 (Jul. 1997).

* cited by examiner

*Primary Examiner*—Le Hien Luu
*Assistant Examiner*—Djenane Bayard
(74) *Attorney, Agent, or Firm*—Akerman Senterfitt (57) ABSTRACT

A method of remotely managing an application distributed across multiple application hosts can include, in a master agent, receiving from an application manager in a second application host a management command for performing a management operation directed to a manageable resource in a remote application host; communicating the management command to a mini-agent in the remote application host; and, in the mini-agent, performing the management operation on the manageable resource by accessing an exposed member of the manageable resource according to the management operation. The step of communicating the management command to the mini-agent can include accessing the mini-agent through a JMX communications connector. The step of accessing the mini-agent can include invoking methods of the mini-agent through an RMI communications interface. Additionally, the step of performing the management operation can include accessing a method of the manageable resource through a management interface to the manageable resource. Notably, the management interface can be an MBean registered in an MBean server in the mini-agent. Accordingly, the step of accessing the method through the interface can include accessing the method exposed by the MBean through the MBean server according to the management operation.

35 Claims, 4 Drawing Sheets

SYSTEM USES APPLICATION MANAGER AND MASTER AGENT TO COMMUNICATE WITH MINI-AGENTS FOR REMOTELY MANAGING APPLICATION RESOURCES DISTRIBUTED ACROSS MULTIPLE JAVA VIRTUAL MACHINES

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of remote applications management and more particularly to a system, method and apparatus for remote management of manageable resources distributed across multiple application hosts.

2. Description of the Related Art

The advent of distributed computing has give rise to what has been dubbed a global crisis of complexity. Paradoxically, that complexity arises from the distributed systems which were intended to make IT departments more flexible. This flexibility has been achieved, but only at the expense of runtime system management issues, which have created a new bottleneck in applications development. In this respect, application management solutions have been developed in response to enterprise application users who have reported that while distributed applications are relatively easy to build, those same distributed enterprise applications are very difficult to administer in a production environment. Moreover, configuration and upgrade operations directed merely to portions of a distributed application are equally hard to manage.

Several attempts have been made to facilitate the management of application resources in distributed applications. For instance, application management software has been developed to provide a graphical view of a distributed application. The graphical view can permit the management of various components of the distributed application. Still, the same application management software has been developed in a platform-specific manner and does not share the portability of modern distributed applications developed using a platform-independent architecture.

Notably, an application management solution for a two-tier, client-server architecture has been developed using the platform-independent Java™ architecture. More particularly, the Java Management extension ("JMX"), defined in the JMX™ specification, define an architecture, design patterns, APIs and services for application and network management using the Java programming language. The JMX specification is a well-known set of specifications and development tools for managing Java environments and building third generation management solutions. The JMX specification has been defined in the document *Java Management Extensions Instrumentation and Agent Specification*, v1.0 published by Sun Microsystems, Inc. of Palo Alto, Calif. on May 3, 2000. The JMX specification is incorporated herein by reference.

Figure 4:
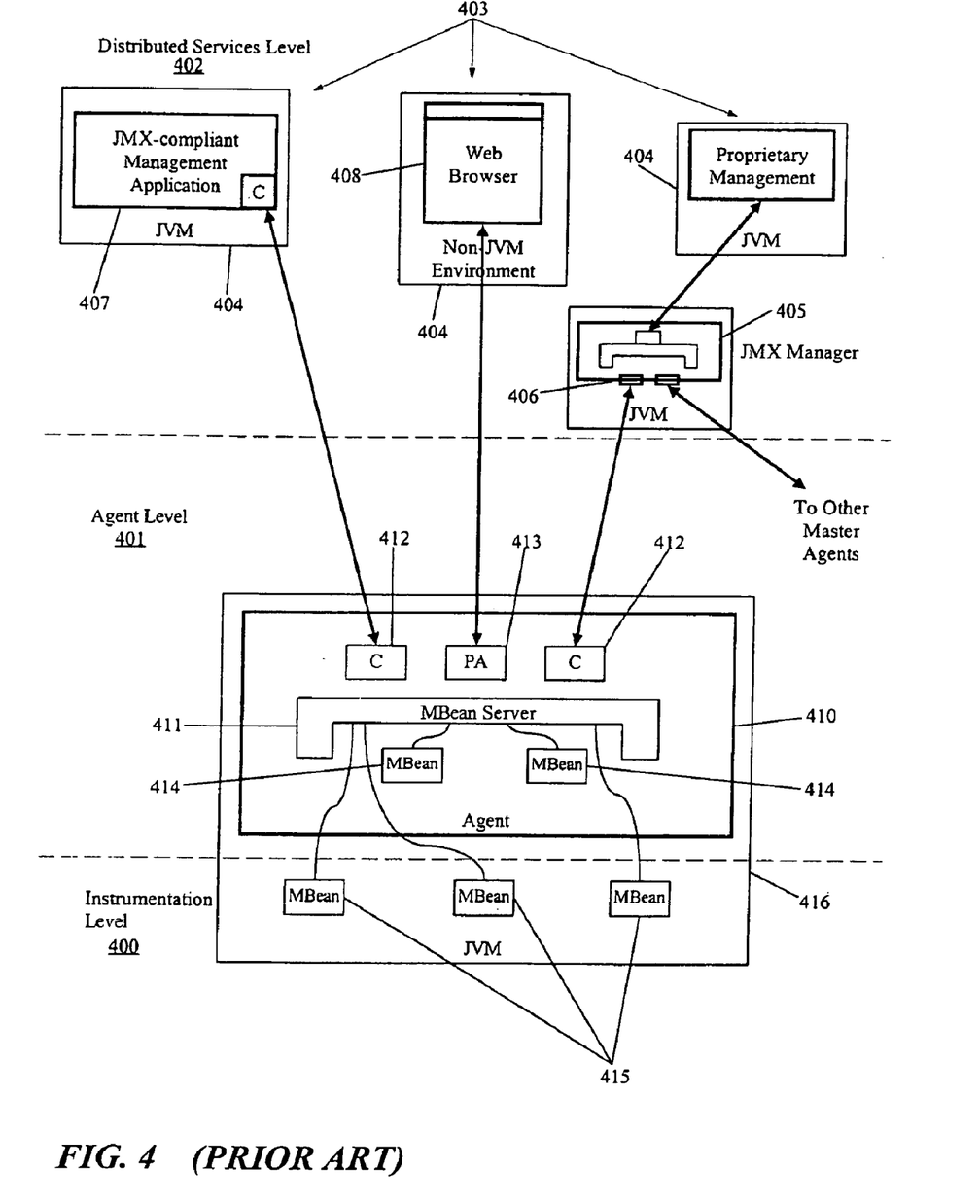
FIG. 4 is a block diagram of the JMX application management architecture of the prior art.

FIG. 4 illustrates the JMX architecture as defined in the JMX specification. The JMX architecture is divided into three levels: the Instrumentation level, the Agent level and the Distributed Services level. The Instrumentation level includes manageable resources which have a management interface referred to as a managed bean ("MBean"). An MBean can include the set of all necessary information and controls that a management application can operate on the manageable resource. More particularly, the management interface of an MBean can be represented as valued attributes which may be accessed, operations which may be invoked, notifications which may be emitted, and the constructors for the MBean's Java class.

MBeans encapsulate attributes and operations through their public methods and follow design patterns for exposing them to an application manager. For example, a read-only attributed in a standard MBean can have merely a "getter" method, whereas "getter" and "setter" methods implement read-write access. An example of an exposed method could include a "shutdown( )" method for terminating the execution of the application.

In the JMX specification, the Agent level controls the manageable resources in a single Java Virtual Machine ("JVM"). More particularly, the Agent level contains the framework for communicating with the manageable resources as well as with the object container in which the resources can be instantiated. The Agent level also contains the framework for communicating with the Distributed Services level. The Distributed Services level interfaces with the Agent level remotely in order to perform management operations on the manageable resources. An example of such a management operation could include the "shutdown( )" method described above.

As implemented in the JMX specification, the Distributed Services layer resides in a JVM separate from the JVM of the Agent level and the Instrumentation level. Significantly, however, the Agent level and the Instrumentation level both resides in the same JVM. A single JMX connector provides the communicative link between the Distributed Services level and the Agent level. Consequently, though the present JMX specification describes an application management model adequate for use when all manageable resources reside in the same application host (a single JVM), in a distributed architecture the manageable resources typically reside across multiple application hosts (multiple JVMs). Thus, what is needed is a system, method and apparatus for remote management of an application distributed across multiple applications hosts.

SUMMARY OF THE INVENTION

The present invention is a system, method and apparatus for remote management of manageable resources distributed across multiple applications hosts. In the present invention, cross-process application communication techniques are utilized in order to remotely manage a distributed application having manageable resources distributed across multiple application hosts. Briefly, one or more application managers residing in one or more application hosts can communicate with a master agent which can reside in an application host separate from the application hosts of the application managers.

The master agent can provide a view to the application managers through which the application managers can remotely perform management operations on the manageable resources without maintaining a specific awareness of the particular application host in which each manageable resource resides. The master agent can receive management commands from the application managers and can communicate each received management command directed to a particular manageable resource residing an a particular remote application host to mini-agents residing in the same remote application host. Notably, the master agent can communicate the received management command through the use of local proxies to the mini-agents.

The mini-agents can, in turn, receive the management commands communicated by the master agent and can apply corresponding management operations to those manageable resources to which the management command had been directed. In consequence, unlike existing methods and systems for managing manageable resources in a client-server environment, the present invention can be used to provide remote management of a distributed application manageable resources in an n-tier enterprise environment.

A system for remote management of manageable resources distributed across multiple application hosts can include an application manager in a first application host; a master agent in a second application host; and, a plurality of mini-agents in remote application hosts separate from the first and second application hosts. In operation, the master agent can receive from the application management commands to perform management operations directed to at least one manageable resource. Subsequently, the master agent can communicate the management commands to a mini-agent in a remote application host which contains the manageable resources. Upon receiving the management commands from the master agent, the mini-agent can command the manageable resources to perform the management operations.

In another representative embodiment, a system for remote management of manageable resources distributed across remote application hosts can include a master agent in a first application host for receiving from an application manager in a second application host management commands to perform management operations directed to selected manageable resources; and, a plurality of mini-agents in the remote application hosts, wherein each remote application host contains only one mini-agent. The master agent can communicate the received management commands to the mini-agents in the remote application hosts. Furthermore, the mini-agents can communicate the received management commands to the selected manageable resources.

In either system, the application manager, master agent and mini-agents can be implemented in the Java programming language. Hence, in one representative embodiment, the first and second application hosts can be JVMs. Also, the remote application hosts can be JVMs. Still, the present invention is to be limited neither to the Java programming language nor JVMs. For example, in other representative embodiments, the remote application hosts can include non-Java environments. In particular, in another representative embodiment, the remote application hosts can include manageable resources which can communicate using industry-standard application communication methodologies, for instance the Common Object Request Broker Architecture ("CORBA"). Accordingly, remote application hosts containing such manageable resources can be UNIX, Linux or Windows® sessions, for example.

Notably, the master agent can include a JMX communications connector for communicating with the mini-agents in the remote application hosts. The master agent also can include a JMX communications connector for communicating with the application manager. Finally, the master agent can include a JMX communications protocol adaptor for providing a protocol-adapted view of the master agent to an application manager. In this particular embodiment, the application manager can be a Web browser or other client-type application which can communicate with a data source using a specified protocol, for example HTML, or SNMP. As such, the application manager can communicate with other application programs using a specified communication protocol consonant with a communications protocol adapted by the JMX communications protocol adaptor.

Notably, the JMX communications connector can include a Java Remote Method Invocation ("RMI") communications interface. RMI enables the programmer to create distributed Java technology-based to Java technology-based applications, in which the methods of remote Java objects can be invoked from other JVMs, both within a single computer and across different computers. A Java technology-based program can make a call on a remote object once it obtains a reference to the remote object, either by looking by the remote object in a bootstrap naming service provided by RMI or by receiving the reference as an argument or a return value. A client can call a remote object in a server, and that server can also be a client of other remote objects. RMI uses object serialization to marshal and un-marshal parameters and does not truncate types, supporting true object-oriented polymorphism. The complete RMI specification is described in the document *Remote Method Invocation Specification*, published by Sun Microsystems, Inc. of Palo Also, Calif. in 1997. The RMI specification is herein incorporated by reference.

Manageable resources in the inventive system can have a managed bean ("MBean") interface. In that case, each mini-agent in a corresponding remote application host can include a managed bean server ("MBean Server") for exposing MBeans contained in the corresponding remote application host to the master agent through a JMX communications connector. More particularly, an MBean server is a registry for objects which are exposed to management operations in an agent, for example a mini-agent. Interfaces to manageable resources which are implemented as MBeans and registered with an agent, for example a mini-agent or a master-agent, through an MBean server can be managed from outside the agent's virtual machine.

Additionally, other objects which are implemented as MBeans can be managed as well. Such objects can include value-added services provided to assist in the management of the manageable resources and components of the JMX infrastructure which can be managed. Accordingly, the master agent can include an MBean server which can expose the members of corresponding manageable resources used to provide agent level services to the mini-agents and the application manager. For example, agent level services can include those operations for configuring the master agent.

The system of the present invention can implement a method of remotely managing manageable resources distributed across multiple application hosts. The method of the invention can include, in a master agent, receiving from an application manager in a second application host a management command for performing a management operation directed to a manageable resource in a remote application host having a mini-agent; communicating the management command to the mini-agent in the remote application host; and, in the mini-agent, performing the management operation on the manageable resource by accessing an exposed member of the manageable resource according to the management operation.

The step of communicating the management command to the mini-agent can include accessing the mini-agent through a JMX communications connector. The step of accessing the mini-agent can include invoking methods of the mini-agent through an RMI communications interface. Additionally, the step of performing the management operation can include accessing a method of the manageable resource through a management interface to the manageable resource. Notably, the management interface can be an MBean registered in an MBean server in the mini-agent. Accordingly, the step of accessing the method through the interface can include accessing the method exposed by the MBean through the MBean server according to the management operation.

Notably, the invention can also include a method for configuring a system for remote management of manageable resources in an application distributed across multiple remote application hosts. A method for configuring a system for remote management of manageable resources in an application distributed across multiple remote application hosts can include starting a master agent in a first application host; starting a plurality of mini-agents in a plurality of corresponding remote application hosts separate from the first application host, each corresponding remote application host containing one of the plurality of mini-agents; communicatively linking each mini-agent to the master agent; and, registering manageable resources in each remote application host with a corresponding mini-agent. In consequence, the distributed manageable resources can be remotely managed by an application manager remote from the remote application hosts containing the manageable resources. In a representative embodiment of this method, the first application host can be a JVM. Additionally, the remote application hosts can include JVMs. Still, the invention is not so limited to JVMs. Rather, the remote application hosts can further include both Java and non-Java environments.

Notably, the manageable resources can have an MBean interface through which selected members of the manageable resources can be accessed. Hence, in another representative embodiment of the present invention, the method of the invention can further include the step of providing an MBean interface to the manageable resources through which the selected members of the manageable resources can be managed. The step of starting a plurality of mini-agents can include starting an MBean server in each of the plurality of mini-agents wherein the MBean server exposes MBeans in the corresponding remote application hosts. Moreover, the registering step can include registering the MBeans with the MBean server.

Finally, the step of communicatively linking each mini-agent to the master agent can include creating RMI connector servers in the master agent and each mini-agent; and, creating RMI connector clients in the master agent and each mini-agent. As a result, the master agent can communicate with the mini-agents through RMI interfaces created by the RMI connector server in each mini-agent and the RMI connector client in the master agent. Moreover, each mini-agent can communicate with the master agent through RMI interfaces created by the RMI connector server in the master agent and the RMI connector client in each mini-agent.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

The present invention is a system, method and apparatus for remote management of an application distributed across multiple application hosts. The system can include an application manager, a master agent, and a plurality of mini-agents which can communicate management commands directed to manageable resources which are received from the application manager. Significantly, the mini-agents can reside in application hosts separate from the application hosts in which the application manager and master agent reside. In this way, the application manager can issue management commands to the master agent which, in turn, can direct the management commands to appropriate mini-agents for ultimate delivery to the manageable resources residing in various, separate application hosts.

Figure 1A:
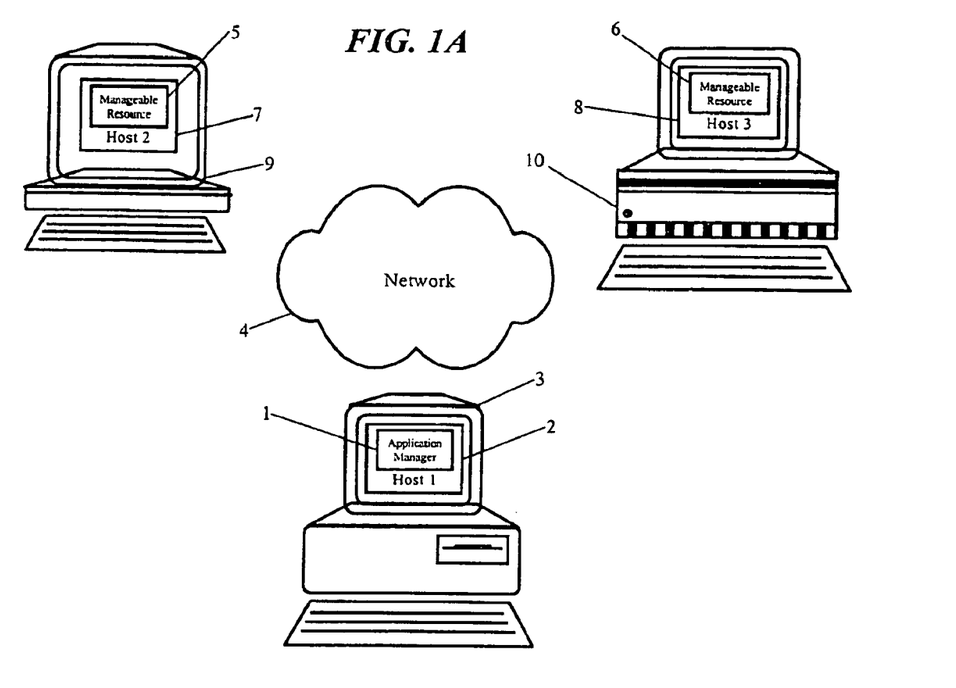
FIG. 1 is a schematic representation of a distributed application remotely managed by an application manager in accordance with the inventive arrangements.
Figure 1B:
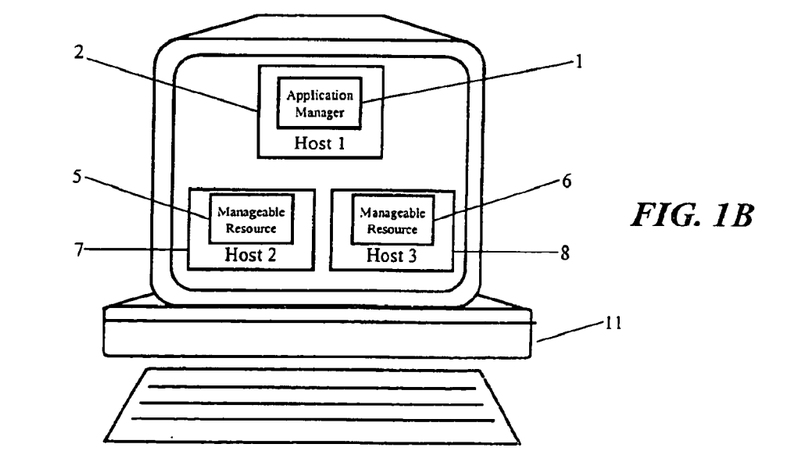

FIGS. 1A and 1B illustrates a basic computer architecture in which the system, method and apparatus of the invention can be implemented and operated. Specifically, FIG. 1A illustrates an architecture in which an application having manageable resources 5, 6 is distributed across multiple application hosts 7, 8 residing in multiple computers 9, 10 communicatively connected in a computer communications network 4. An application manager 1 residing an application host 2 in a computer 3 can manage the manageable resources 5, 6. FIG. 1B illustrates an embodiment of the present invention wherein the application hosts 2, 7, 8 in which the manageable resources 5, 6 and the application manager 1 reside are contained in a single computer 11. Thus, the invention is not limited to the various combinations of application hosts and computers shown in FIG. 1A.

Notably, a manageable resource can be any portion of a distribution application, for example a single object, a component, a class instance, a complete program, etc. The manageable resources 5, 6 can reside in an application host 7, 8 which can be an operating system session, a virtual machine or any other suitable process address space in which programs can execute. The computers 9, 10 can be any suitable computing device, ranging from an embedded system, to a handheld device to a desktop computer and beyond. The application manager 1 can be any suitable program or functional interface which a view of the manageable resources 5, 6 can be presented and through which management operations can be directed to the manageable resources 5, 6. For example, the application manager 1 can be an application specific program directed to managing particular manageable resources 5, 6. Alternatively, the application manager 1 can be a Web browser through which the attributes of the manageable resources 5, 6 can be viewed and operated upon using HTTP as the protocol for communicating management operations.

Figure 2:
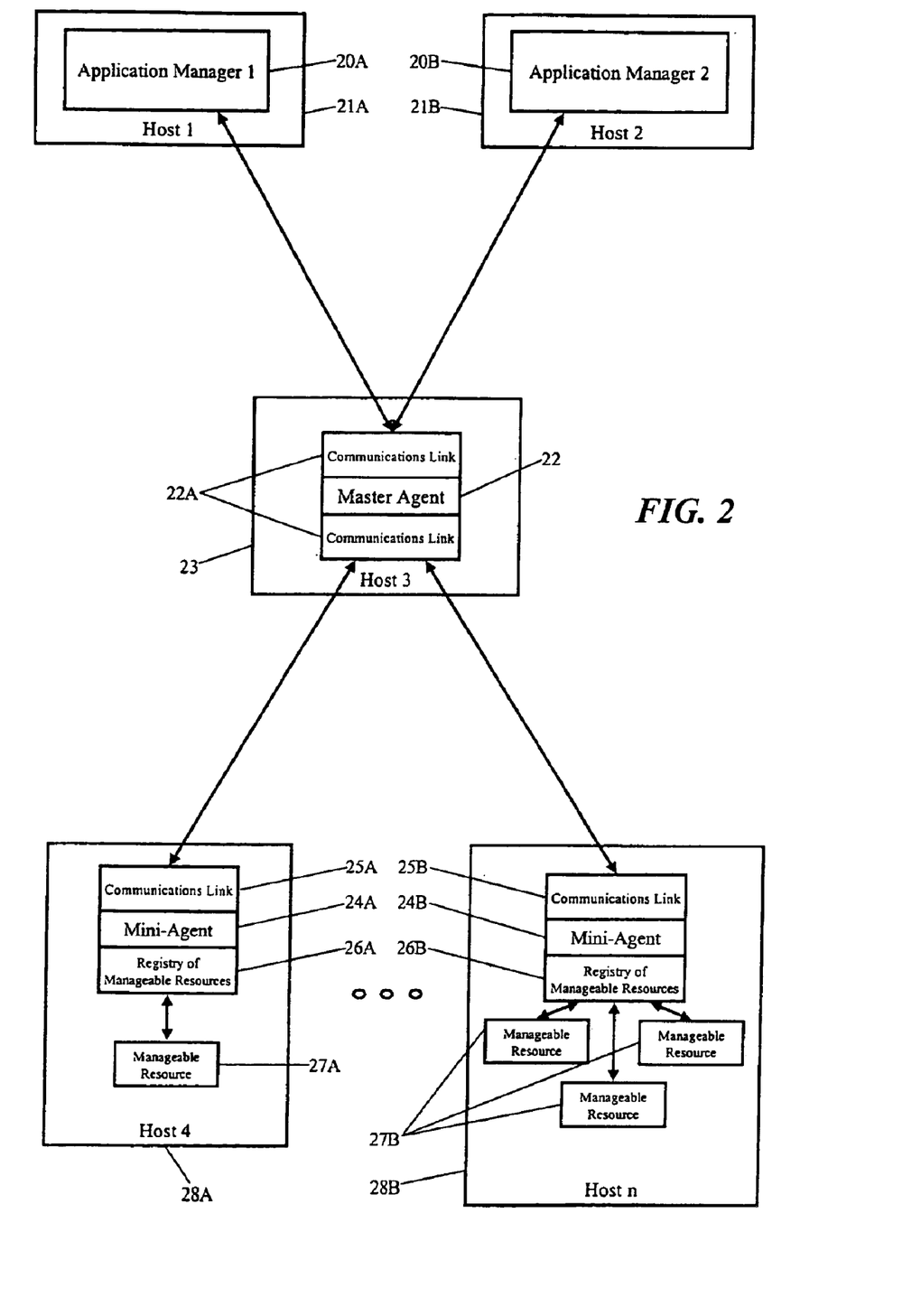
FIG. 2 is a block diagram of an application management architecture in accordance with the inventive arrangements.

FIG. 2 is a block diagram illustrating the relationships between the various elements of the present invention. As shown in FIG. 2, an application comprising manageable resources 27A, 27B distributed across multiple application hosts 28A, 28B can respond to management operations commanded by application managers 21A, 21B, without requiring the application managers 21A, 21B to have specific knowledge of the particular application hosts in which the manageable resources 27A, 27B reside. This advantageous result can arise from the bifurcation of an agent layer useful for managing resources in a 2-tier client-server system into master agent and a mini-agent layers.

More particularly, the master agent 22 residing in an application host 23 can include a communications link 22A between the application managers 21A, 21B through which the master agent 22 can receive management commands directed to manageable resources 27A, 27B which can be distributed across multiple application hosts, for example application hosts 28A, 28B. The communications link 22A also can be used to communicate with mini-agents 24A, 24B. Correspondingly, the mini-agents 24A, 24B can include communications links 25A, 25B with which the mini-agents 24A, 24B can maintain communications with the master agent 22.

Each mini-agent 24A, 24B in corresponding application hosts 28A, 28B can include a registry 25A, 25B in which manageable resources 27A, 27B residing in the corresponding application host 28A, 28B can register. By registering with the mini-agent 24A, 24B, manageable resources 28A, 28B can provide an interface through which the mini-agent can communicate management operations specified by management commands received from the application managers 21A, 21B via the master agent 22.

As shown in FIG. 2, the invention is not limited to any particular arrangement of application managers, mini-agents are application hosts. Specifically, any number of application managers can be used to command management operations to the manageable resources of a distributed application. Moreover, the manageable resources can be distributed across any number of application hosts ranging from a single application host to thousands of application hosts and beyond. Accordingly, to further emphasize the potential number of application hosts across which the manageable resources can be distributed, FIG. 2 explicitly shows ellipses between the application host 28A and the application host 28B.

Finally, the invention is not limited to the number of manageable resources contained in any one application host. Rather, an application host can have as few as no manageable resources registered with a mini-agent and as many as thousands or more manageable resources registered with a mini-agent in a single application host. Hence, the number of manageable hosts illustrated in FIG. 2 are shown for illustrative purposes only are not to be viewed as a limitation of the present invention.

Figure 3:
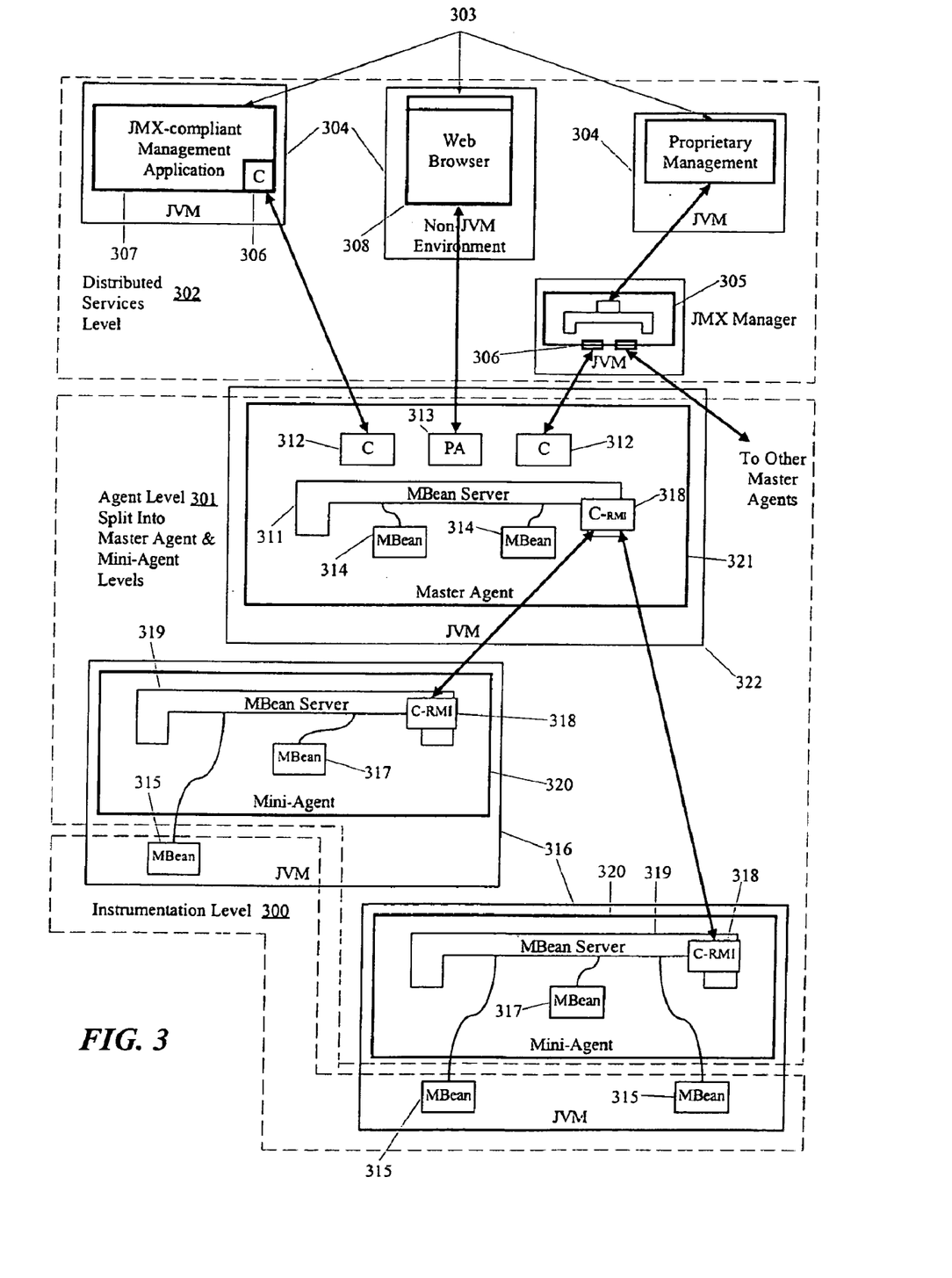
FIG. 3 is a block diagram of the application management architecture of FIG. 2 configured for operation with application managers and manageable resources complaint with the JMX application management architecture.

FIG. 3 is a block diagram of the application management architecture of FIG. 2 configured for operation with application managers and manageable resources complaint with the JMX application management architecture. As discussed above and illustrated in FIG. 4, the JMX application management architecture specifies three layers distributed across at least two applications hosts, typically in the form of JVMs: a Distributed Services layer 402, an Agent layer 401 and an Instrumentation layer 400. Application managers 403 reside in application hosts 404 (JVMs and non-JVMs) in the Distributed Services layer 402. As is apparent from FIG. 4, the Distributed Services layer 402 can interface with the agent 410 in the Agent layer 401 through JMX connectors 412 and JMX protocol adaptors 413.

Significantly, the agent 410 resides in a JVM application host 416 separate from the application hosts 404 of the application managers 403. The agent 410 can provide to the application managers 403 a conduit through which the application managers 403 can remotely perform management operations on the manageable resources residing in same JVM application host 416 as the agent 410. Notably, the agent 410 and JMX compliant management application 407 can communicate through a JMX connector pair 406 and 412. Similarly, the agent 410 and the JMX Manager 405 can communicate through a JMX connector pair 406 and 412. By comparison, an application manager operating in a non-JVM environment, for example the Web browser 408, can communicate with the agent 410 using a specific communications protocol, for example HTTP, which can be facilitated by a JMX protocol adaptor 413.

The instrumentation layer 400 can contain the manageable resources managed by the application managers 403. In particular, the manageable resources implement and extend Javabeans referred to as MBeans 415 as described in the JMX specification. These MBeans 415 expose properties and/or methods that the application intends to expose to the application managers. An example of such a method can be the "shutdown( )" method described above.

The Agent level 401 can contain services for managing the MBeans 415 of the Instrumentation level 400. This set of services for handling the MBeans 415 is known as an MBean server 411. Notably, as shown in FIG. 4, MBeans 414 also can expose other Agent level services for management by the application manager. Examples of such Agent level services can include dynamic class loading, MBean attribute monitoring, timer-based scheduling mechanisms and MBean relation services. Thus, in accordance with the JMX specification, the application managers 403 can manage only those applications which have manageable resources residing in a single JVM.

In contrast, the inventive JMX compatible architecture shown in FIG. 3 facilitates the management of manageable resources distributed about multiple application hosts, for example multiple JVMs. To accomplish this feat, the JMX compatible architecture of the present invention bifurcates the Agent level 401 of the JMX specification into a master agent level and a mini-agent level. As shown in FIG. 3, mini-agents 320 reside in separate JVMs 316 (or non-JVM environments as the case may be) of the managed application.

Significantly, a master agent 321 also is provided in a JVM 322 separate from the JVMs 316 of the mini-agents 320. In this way, application managers 303 need only maintain an awareness of the master agent 321 rather than the multitude of possible mini-agents 320 distributed across multiple application hosts 316. The master agent 321 can include an MBean server 311 for managing MBeans 314 which provide an interface to the Agent level services of the master agent 321. Finally, the master agent 321 can include a communications link in the form of a JMX connector 318 for two-way communications with each mini-agent 320. JMX connectors 312 also can be used for two-way communications with the JMX-compliant management application 307 and the JMX Manager 305. Additionally, a JMX protocol adaptor can be used for two-way communications with an protocol specific interface, for example Web browser 308. Notably, communications between the master agent 321 and each mini-agent 320 and between the master agent 321 and JMX-compliant application managers 305, 307 can occur using RMI. In that case, the JMX connectors 312, 318 can be RMI connectors.

In RMI, while the definition of a remote service is coded using a Java interface, the implementation of the remote service is coded in a class. RMI supports two classes that implement the same interface. The first class is the implementation of the behavior and it executes in the server. The second class acts as a proxy for the remote service and it executes on the client. In operation, when a client program invokes method calls on the proxy object, RMI sends the request to the remote JVM, and forwards it to the implementation. Any return values provided by the implementation are sent back to the proxy and then to the client program.

The RMI implementation is essentially built from three abstraction layers. The first is the Stub and Skeleton layer, which lies just beneath the view of the developer. This layer intercepts method calls made by the client to the interface reference variable and redirects these calls to a remote RMI service. The next layer is the Remote Reference Layer. This layer understands how to interpret and manage references made from clients to the remote service objects. In the Java Development Kit version 1.1, the Remote Reference Layer connects clients to remote service objects that are running and exported on a server. The connection is a one-to-one, unicast link. In the Java 2 SDK, the Remote Reference Layer has been enhanced to support the activation of dormant remote service objects through a Remote Object Activation facility.

Hence, in the present invention, the master agent 321 can maintain local stubs (not shown) which act as proxies to the mini-agents residing in separate JVMs. Additionally, the master agent can include RMI remote service objects (not shown) which can communicate through remote stubs (not shown) residing in both application managers and mini-agents which act as proxies to the services of the master agent. Still, the use of RMI notwithstanding, the invention is not limited in regard to any particular communications mechanism. Rather, any suitable interprocess communications technique, for example TCP/IP, can suffice.

Each mini-agent 320 can access the manageable resources of its JVM 316 through a local MBean server 319. Accordingly, the manageable resources of the present invention preferable provide an interface in the form of an MBean 315. Furthermore, like the master agent 321, each mini-agent 320 also has a JMX connector 318 for two-way communications with the master agent. As before, communications between the master agent 321 and each mini-agent 320 can occur using RMI although the invention is not limited in regard to the mechanism for communications between the master agent 321 and the mini-agents 320.

The master agent 321 can receive management commands from a variety of application managers 303. In particular, as shown in FIG. 3, the application managers 303 can comprise JMX-compliant management applications 307, proprietary management applications which utilize a JMX manager 305 to communicate with the master agent 321, or even a protocol specific interface, for example Web browser 308. In the case of a protocol specific interface, the master agent can further include a JMX communications protocol adapter 313 for adapting communications between the interface and the manageable resources to a protocol specified by the interface. Exemplary protocols can include, but are not limited to HTTP and SNMP.

To configure a distributed application for remote management of the manageable resources contained therein, the following process can be implemented using Java programming techniques well known in the art. Still, one skilled in the art will recognize that there are numerous variations of the foregoing method and the specific method which follows merely is provided for illustrative purposes. Accordingly, the invention is not to be limited to only one process for configuring a distributed application for remote management.

A representative process for configuring the distributed application can begin by starting the master agent 321. Subsequently, the master agent 321 can start a local MBean server 311 and MBeans 314 for exposing local agent level services can be started as well. The master agent 321 can create a pre-configured number of mini-agent stubs in accordance with Java RMI to act as local proxies to mini-agents 320.

The mini-agents 320 themselves can be started in the various JVMs 316. Notably, the mini-agents 320 can be started in any number of ways including by way of the mini-agents stubs in the master agent 321. Each mini-agents 320 can start a corresponding local MBean server 319 and local MBeans 315, 317 can be created. Finally, the mini-agents 320 can create RMI connectors 318 to expose the local MBean servers 319 to the master agent 321. In consequence, the mini-agents 320 and the master agent can communicate and interoperate through the RMI connectors 318. As a result, the MBeans 315 can facilitate remote management operations commanded by the application managers 303 through the master agent 321 despite the distribution of the MBeans 315 about multiple JVMs 316.

What is claimed is:

1. A system for remote management of manageable resources distributed across multiple application hosts comprising:

an application manager in a first application host;

a master agent in a second application host; and, a plurality of mini-agents in remote application hosts separate from said first and second application hosts, wherein each of said first application host, said second application host, and said remote application hosts are software machines configured to interpret compiled machine-independent code;

said master agent receiving from said application manager a management command to perform at least one management operation directed to at least one manageable resource;

said master agent communicating said management command to a mini-agent in a remote application host containing said at least one manageable resource;

said mini-agent commanding said at least one manageable resource to perform said at least one management operation responsive to receiving said management command from said master agent, wherein each of said first application host, said second application host, and said remote application hosts are Java Virtual Machines ("JVMs").

2. The system of claim 1, wherein said master agent comprises:

a JMX communications protocol adaptor for providing a protocol-adapted view of said master agent to said application manager.

3. The system of claim 1, wherein each manageable resource has a managed bean ("MBean") interface, and wherein said master agent comprises an MBean server.

4. The system of claim 3, wherein each said mini-agent comprises an MBean server exposing said MBeans to said master agent application through a JMX communications connector.

5. The system of claim 1, wherein said master agent acts as a communication intermediary between said application manager and said mini-agents, wherein communications between said application manager and said master agent as well as communications between said master agent sand said mini-agents utilize a common remotely accessible communication protocol.

6. The system of claim 5, wherein said master agent comprises a Java Management Extension ("JMX") communications connector for communicating with said application manager and said mini-agents.

7. The system of claim 6, wherein said JMX communications connector comprises a Java Remote Method Invocation communications interface.

8. A method of remotely managing manageable resources distributed across multiple application hosts comprising:

in a master agent in a first application host, receiving from an application manager in a second application host a management command for performing a management operation directed to a manageable resource in a remote application hosts having a mini-agent, wherein each of said first application host, and second application host, and said remote application hosts are software machines configured to interpret compiled machine-independent code;

communicating said management command to said mini-agent in said remote application host; and, in said mini-agent, performing said management operation on said manageable resource by accessing an exposed member of said manageable resource according to said management operation, wherein each of said first application host, said second application host, and said remote application hosts are Java Virtual Machines ("JVMs").

9. The method of claim 8, wherein said step of communicating said management command to said mini-agent comprises:

accessing said mini-agent through a JMX communications connector.

10. The method of claim 9, wherein said step of accessing said mini-agent comprises:

accessing said mini-agent through an RMI communications interface.

11. The method of claim 8, wherein said step of performing said management operation comprises:

accessing a member of the manageable resource through a management interface to said manageable resource according to said management operation.

12. The method of claim 11, wherein said management interface is a managed bean ("MBean") registered in an MBean server in said mini-agent.

13. The method of claim 12, wherein said step of accessing said method comprises:

accessing a member of the manageable resource exposed to said mini-agent by said MBean through said MBean server according to said management operation.

14. A method for configuring a system for remote management of manageable resources distributed across multiple remote application hosts comprising:

starting a master agent in a first application host;

starting a plurality of mini-agents in a plurality of corresponding remote application hosts separate from said first application host, each corresponding remote application host containing one of said plurality of mini-agents, wherein each of said first application host and said remote application hosts are software machines configured to interpret compiled machine-independent code;

communicatively linking each mini-agent to said master agent; and, registering manageable resources in each remote application host with a corresponding mini-agent, whereby the distributed manageable resources can be remotely managed by an application manager in an application host remote from said remote application hosts containing the manageable resources, wherein each said first application host and said remote hosts are Java Virtual Machines ("JVMs").

15. The method of claim 14, further comprising:

providing a managed bean ("MBean") interface to the manageable resources through which selected members of the manageable resources can be accessed.

16. The method of claim 15, wherein said step of starting a plurality of mini-agent comprises:

starting a managed bean ("MBean") server in each of said plurality of mini-agents, said MBean server exposing MBeans in said corresponding remote application hosts.

17. The method of claim 16, wherein said registering step comprises:

registering said MBeans with said MBean server.

18. The method of claim 14, wherein said step of communicatively linking each mini-agent to said master agent comprises:

creating RMI connector servers in said master agent and each said mini-agent; and, creating RMI connector clients in said master agent and each said mini-agent;

said master agent communicating with said mini-agents and said mini-agents communicating with said master agent through RMI interfaces created by said RMI connector servers and said RMI connector clients.

19. A system for remote management of manageable resources distributed across remote application hosts comprising:

a master agent in a first application host for receiving from an application manager in a second application host management commands to perform management operations directed to selected manageable resources; and, a plurality of mini-agents in the remote application hosts, each remote application host containing only one mini-agent, wherein each of said first application host, said second application host, and said remote application hosts are software machines configured to interpret compiled machine-independent code;

said master agent communicating said received management commands to said mini-agents in the remote application hosts;

said mini-agents communicating said received management commands to said selected manageable resources, wherein each of said first application host, said second application host, and said remote application hosts are Java Virtual Machines ("JVMs").

20. The system of claim 19, wherein said master agent comprises a Java Management Extension ("JMX") communications connector for communicating with said mini-agents in the remote application hosts.

21. The system of claim 20, wherein said JMX communications connector comprises a Java Remote Method Invocation ("RMI") communications interface.

22. The system of claim 19, wherein said master agent comprises:

a JMX communications connector for providing a view of said master agent to a JMX-compliant application manager; and, a JMX communications protocol adaptor for providing a protocol-adapted view of said master agent to an application manager residing in a non-JVM environment.

23. The system of claim 19, wherein the manageable resources have a managed bean ("MBean") interface.

24. The system of claim 23, wherein each mini-agent in a corresponding remote application host comprises a managed bean server ("MBean Server") for exposing MBeans contained in said corresponding remote application host to said master agent through a JMX communications connector.

25. A machine readable storage, having stored thereon a computer program for remotely managing manageable resources distributed across multiple application hosts, said computer program having a plurality of code sections executable by a machine for causing the machine to perform the steps of:

in a master agent in a first application host, receiving from an application manager in a second application host a management command for performing a management operation directed to a manageable resource in a remote application host having a mini-agent, wherein each of said first application host, said second application host, and said remote application hosts are software machines configured to interpret compiled machine-independent code;

communicating said management command to said mini-agent in said remote application host; and in said mini-agent, performing said management operation on said manageable resource by accessing an exposed member of said manageable resource according to said management operation, wherein each of said first application host, said second application host, and said remote application hosts are Java Virtual Machines ("JVMs").

26. The machine readable storage of claim 25, wherein the step of communicating said management command to said mini-agent comprises:

accessing said mini-agent through a JMX communications connector.

27. The machine readable storage of claim 26, wherein said step of accessing said mini-agent comprises:

accessing said mini-agent through an RMI communications interface.

28. The machine readable storage of claim 25, wherein said step of performing said management operation comprises:

accessing a member of said manageable resource through a management interface to said manageable resource according to said management operation.

29. The machine readable storage of claim 28, wherein said management interface is a managed bean ("MBean") registered in an MBean server in said mini-agent.

30. The machine readable storage of claim 29, wherein said step of accessing said method comprises:

accessing a member of the manageable resource exposed to said mini-agent by said MBean through said MBeans server according to said management operation.

31. A machine readable storage, having stored thereon a computer program for configuring a system for remote management of manageable resources distributed across multiple remote application hosts, said computer program having a plurality of code sections executable by a machine for causing the machine to perform the steps of:

starting a master agent in a first application host;

starting a plurality of mini-agents in a plurality of corresponding remote application hosts separate from said first application host, each corresponding remote application host containing one of said plurality of mini-agents, wherein each of said first application host and said remote application hosts are software machines configured to interpret compiled machine-independent code;

communicatively linking each mini-agent to said master agent; and, registering manageable resources in each remote application host with a corresponding mini-agent, whereby the distributed manageable resources can be remotely managed by an application manager in an application host remote from said remote application hosts containing the manageable resources, wherein each of said first application host and said remote hosts are Java Virtual Machines ("JVMs").

32. The machine readable storage of claim 31, further comprising:

providing a managed bean ("MBean")interface to the manageable resources through which selected members of the manageable resources can be accessed.

33. The machine readable storage of claim 32, wherein said step of starting a plurality of mini-agents comprises:

starting a managed bean ("MBean") server in each of said plurality of mini-agents, said MBean server exposing MBeans in said corresponding remote application hosts.

34. The machine readable storage of claim 33, wherein said registering step comprises:

registering said MBeans with said MBean server.

35. The machine readable storage of claim 31, wherein said step of communicatively linking each mini-agent to said master agent comprises:

creating RMI connector servers in said master agent and each said mini-agent; and, creating RMI connector clients in said master agent and each said mini-agent; said master agent communicating with said mini-agents and said mini-agents communicating with said master agent through RMI interfaces created by said RMI connector servers and said RMI connected clients.

* * * * *